US009870391B1

(12) United States Patent
Strand et al.

(10) Patent No.: US 9,870,391 B1
(45) Date of Patent: Jan. 16, 2018

(54) PEOPLE SEARCH USING PROXIMITY (75) Inventors: William Alexander Strand, Issaquah, WA (US); Jerry C. Lane, III, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1501 days.

(21) Appl. No.: 12/847,282

(22) Filed: Jul. 30, 2010

(51) Int. Cl.
*G06F 17/30* (2006.01)
*G06Q 10/10* (2012.01)

(52) U.S. Cl.
CPC ....... *G06F 17/30424* (2013.01); *G06Q 10/10* (2013.01)

(58) Field of Classification Search
CPC .................... G06F 17/30424; G06Q 10/10
USPC ......................................................... 707/722
See application file for complete search history.

(56) References Cited

U.S. PATENT DOCUMENTS

| 5,873,095 | A  | * | 2/1999  | Gore ...................... G06Q 10/06 |
| 6,718,341 | B1 | * | 4/2004  | Berstis ................. G06Q 10/087 |
| 6,931,399 | B2 | * | 8/2005  | Cheng ............... G06F 17/30867 |
|           |    |   |         | 707/769 |
| 8,204,897 | B1 | * | 6/2012  | Djabarov .......... G06F 17/30705 |
|           |    |   |         | 707/767 |
| 2004/0193595 | A1 | * | 9/2004  | Kaminsky .............. G06Q 10/10 |
| 2005/0084152 | A1 | * | 4/2005  | McPeake .......... G06F 17/30985 |
|           |    |   |         | 382/173 |
| 2005/0102368 | A1 | * | 5/2005  | Forman .................. H04L 51/28 |
|           |    |   |         | 709/207 |
| 2006/0047725 | A1 | * | 3/2006  | Bramson ....................... 707/204 |
| 2006/0059142 | A1 | * | 3/2006  | Zvinyatskovsky .... G06Q 30/08 |
| 2007/0143309 | A1 | * | 6/2007  | Malik ............... G06F 17/30864 |
| 2007/0174304 | A1 | * | 7/2007  | Shrufi .................... G06Q 10/10 |
| 2007/0271232 | A1 | * | 11/2007 | Mattox .................. G06Q 10/10 |
| 2008/0195586 | A1 | * | 8/2008  | Arnold ............. G06F 17/30864 |
| 2008/0228547 | A1 | * | 9/2008  | Doss ................ G06Q 10/06314 |
|           |    |   |         | 705/7.19 |
| 2009/0265105 | A1 | * | 10/2009 | Davis ..................... G01C 21/20 |
|           |    |   |         | 701/300 |
| 2009/0319595 | A1 | * | 12/2009 | Millmore ................ H04L 67/24 |
|           |    |   |         | 709/201 |
| 2009/0327227 | A1 | * | 12/2009 | Chakra .................. G06Q 10/10 |
| 2011/0040741 | A1 | * | 2/2011  | Korte ................ G06F 17/30867 |
|           |    |   |         | 707/706 |
| 2011/0106850 | A1 | * | 5/2011  | Li ...................... G06F 17/30699 |
|           |    |   |         | 707/780 |
| 2011/0145719 | A1 | * | 6/2011  | Chen ....................... G06Q 10/10 |
|           |    |   |         | 715/739 |

(Continued)

OTHER PUBLICATIONS

Book entitled "How to Succeed in Business Using LinkedIn", by Butow et al., published on Aug. 27, 2008.*

(Continued)

*Primary Examiner* — Mahesh Dwivedi
(74) *Attorney, Agent, or Firm* — Thomas Horstemeyer, LLP (57) ABSTRACT

Disclosed are various embodiments for providing a people search that uses proximity in ranking results. A search query for a person is obtained from a user. The search query is executed on a directory comprising profiles that each correspond to a respective person. Resulting profiles that match the search query are thereby obtained. The resulting profiles are ordered based at least in part on a measure of proximity of each respective person to the user.

21 Claims, 4 Drawing Sheets

(56) References Cited

U.S. PATENT DOCUMENTS

2012/0130823 A1* 5/2012 Levin ................ G06Q 30/0273
705/14.69
2016/0034583 A1* 2/2016 Agarwal ............ G06F 17/3053
707/706

OTHER PUBLICATIONS

Article entitled "Tempworks Help Documents", by Tempworks, Copyright 2010.*
Article entitled "How to Search a Social Network", by Adamic et al., dated Jan. 23, 2004.*
Article entitled "What the Google Intranet Looks Like", by Lenssen et al., dated Nov. 28, 2007.*
Article entitled "People You May Know: Helping You Discover Those Important Professional Relationships", by Ryu, dated May 12, 2010.*
Article entitled "How to Get the Most Value from Social Computing for Business with Microsoft", by Fu, dated Jun. 2008.*
Article entitled "Make a Connection with Barack Obama on LinkedIn", by McCarthy, dated Sep. 11, 2007.*
Article entitled "Announcing LinkedIn's New Search Platform", by Kozak, dated Nov. 24, 2008.*
Article entitled "Dorm History Search", by Harvard, dated Feb. 14, 2007.*

* cited by examiner

PEOPLE SEARCH USING PROXIMITY

BACKGROUND

Within a large organization, it may be difficult to keep track of email addresses, telephone numbers, and/or other information associated with employees. To this end, an employee directory may be provided to enable users to search for a profile and/or information associated with a specific employee. However, users sometimes may not know the full name of the employee for whom they seek information. For example, a user may search in the employee directory for an employee with only the first name of the employee.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing a people search using proximity as an attribute in ranking the results. As a non-limiting example, a user who is an employee of an organization may be searching for a person named "William" in an employee directory. There may be hundreds of people named "William" that work for the organization. The numerous results may be returned in any order, such as alphabetically by last name. Various embodiments of the present disclosure may be configured to determine a location of the user and to sort the results based in part on a measure of proximity between the user and each employee in the results. The principles discussed herein may be extended to any type of people directory, such as school directories, alumni directories, professional directories, social networking directories, and so on. In the following discussion, a general description of the system and its components is provided, followed by a discussion of the operation of the same.

Figure 1:
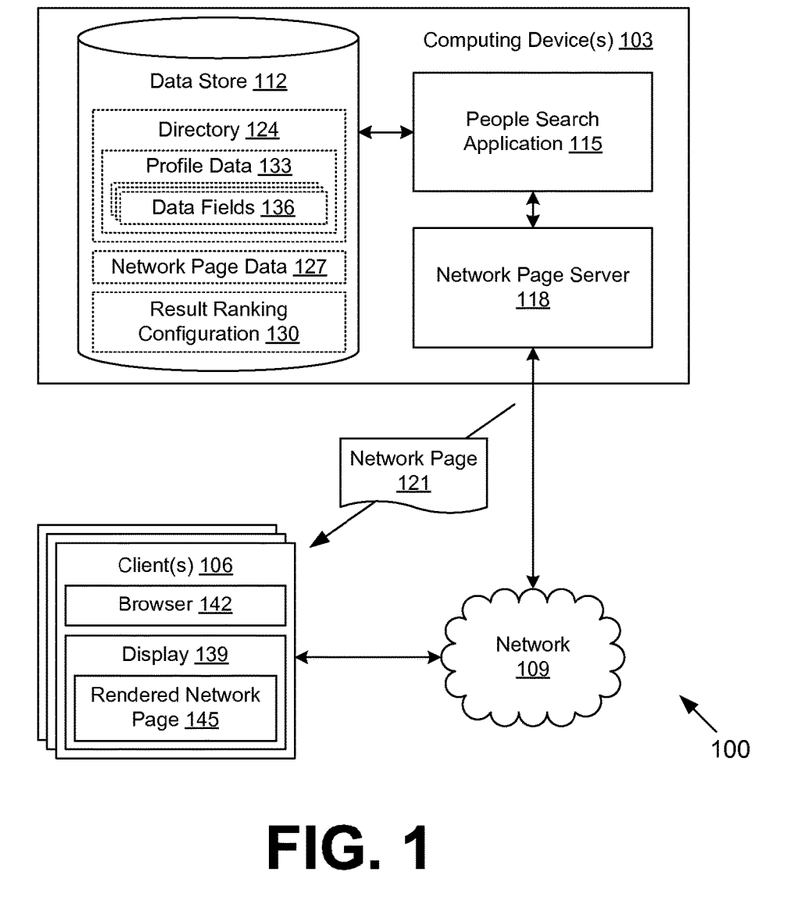
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data store 112 may include, for example, a relational database management system, a collection of files, and/or other data storage and retrieval mechanisms. The data stored in the data store 112, for example, is associated with the operation of the various applications and/or functional entities described below.

The components executed on the computing device 103, for example, include a people search application 115, a network page server 118, and other applications, services, processes, systems, engines, or other functionality not discussed in detail herein. The people search application 115 is executed to receive and execute search queries for people and to produce an ordered listing of the results. The people search application 115 may, in some embodiments, be configured to generate network pages 121, such as web pages, gopher pages, and/or any other type of network content that may contain the people search results. In various embodiments, the people search application 115 may comprise one or more lightweight directory access protocol (LDAP) components, Microsoft® Active Directory components, and/or other directory access components.

The network page server 118 is executed to serve up the network pages 121 to the client 106 over the network 109. In some embodiments, the network page server 118 may comprise a commercially available hypertext transfer protocol (HTTP) server application, such as Apache® HTTP Server, Apache® Tomcat®, Jetty, Microsoft® Internet Information Services, and/or other server applications. In some embodiments, the network page server 118 may be optional and the people search application 115 may communicate directly with a thin or thick client application executing in the client 106.

The data stored in the data store 112 includes, for example, a directory 124, network page data 127, a result ranking configuration 130, and potentially other data. The directory 124 may correspond to any directory that provides information about people. To this end, the directory 124 may comprise an LDAP directory, a social network directory, and/or any other type of directory. The directory may include profile data 133 for each of a multitude of people, including a plurality of data fields 136 for each person.

Such profile data 133 may include, but is not limited to, name, location, work related information, contact information, photos, and other data. The name may include, for example, a first name, a last name, middle name(s) or initials, a prefix, a suffix, nicknames, etc. The location may include, for example, building identifiers, office identifiers, floor identifiers, suite identifiers, reference coordinates, current coordinates determined by the global positioning system (GPS), triangulation, or trilateration, etc. Work related information may include, for example, job titles, departments, teams, access privileges, current projects, work history, etc. Contact information may include, for example, telephone numbers, cell numbers, fax numbers, email addresses, instant message screen names, account names, residence addresses, mailing addresses, etc.

The network page data 127 may include various data used in generating the network pages 121. For example, the network page data 127 may include images, graphics, templates, text, style sheets, and/or other data. The result ranking configuration 130 may include parameters, settings, and other data used to configure how profile results are ranked. For example, the result ranking configuration 130 may specify how a measure of proximity is calculated between two profiles in the directory 124 and how such a measure may be used in ranking the results. The result ranking configuration 130, for example, may specify a greater proximity measure between two employees who are on the same team but work in different buildings versus two employees who work in the same building but are on completely unrelated teams. To this end, the result ranking configuration 130 may include weights for the components of various measures. The result ranking configuration 130 may also specify with weights how the various measures may be combined and applied to results to arrive at a final ranking.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may also include a display 139. The display 139 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 142 and/or other applications. The browser 142 may be executed in a client 106, for example, to access and render network pages 121 or other network content served up by the computing device 103 and/or other servers. A rendered network page 145 may be shown by the browser 142 on the display 139. The client 106 may be configured to execute applications beyond browser 142 such as, for example, email applications, instant message applications, and/or other applications.

Next, a general description of the operation of the various components of the networked environment 100 is provided. To begin, a user at a client 106 may request and obtain a network page 121 from the computing device 103 that allows the entry of a search query for a person. The people search application 115 may obtain the identity of the user at the client 106 though security credentials such as username and password, a network address of the client 106, one or more cookies associated with the browser 142, or through another approach.

The user enters a search query for a person who may be listed in the directory 124. The user may search on a variety of data fields 136, such as name, job title, building, and so on. The user may enter a search query to be fully matched or partially matched in the results. For example, in one embodiment, a user may enter the beginning letters of a last name in a name field. A user interface component may be provided to enable partial matching. Boolean operators and/or other connectors may be used within the search query in some embodiments.

In one example user interface, the user may specify the specific data field(s) 136 to be searched. As an example, a drop-down box may be provided for the user to select a field to be searched. As another example, a user may enable one or more checkboxes associated with descriptions of data fields 136. In another example user interface, the user may merely specify a search string without other context.

The search query is sent from the client 106 over the network 109 to the computing device 103. The search query may be embedded, for example, within an HTTP "get," "post," "put," or another type of network page 121 request. Accordingly, the search query may be received by the network page server 118 and submitted to the people search application 115. Where the people search application 115 is implemented as a web service, the people search application 115 may receive the search query as part of a service call from a service client application over the network 109.

The people search application 115 proceeds to execute the search query on the directory 124. Where the data store 112 includes a relational database management system, the people search application 115 may prepare a structured query language (SQL) query based on the search query. In other embodiments, the people search application 115 may perform the search by traversing a data structure such as a tree, linked list, vector, hash table, or other type of data structure. Ultimately, a set of search results are returned that correspond to profile entries in the directory 124 that match or partially match the search query. In some embodiments, the search may be performed on other data in addition to the directory 124 such as documents, images, audio, etc. The set of search results may be ranked, for example, in random order, alphabetical order, an order according to match quality, or some other order. Such an order may be provided by the interface to the data store 112 in some embodiments.

Thereafter, the people search application 115 may apply an order to the set of search results according to the result ranking configuration 130. In particular, the people search application 115 may sequence the search results that are profiles based in part on a measure of proximity of the person associated with the search result relative to the user who submitted the search query. As a non-limiting example, a location in coordinates may be available for the user and for each person associated with the search results, and the search results may be sequenced in decreasing or increasing order with respect to distances computed between the locations. As another non-limiting example, a building location or other designated work location may be available for the user and for each person associated with the search results, and the search results may be sequenced in decreasing or increasing order with respect to a distance measure between the building locations. Although the distance measure in such an example may be based on geographic distance, the distance measure may also be determined based on any preconfigured measure of relative distance.

It may be the case that profiles of people who have some other significant association with the user may be ranked more prominently than profiles of people who are geographically closer. For example, in the case of an employee directory, profiles of employees that work in the same group or team may be ranked more prominently than profiles of employees that work in an entirely different group or team but are relatively closer geographically. In other words, the user may be more likely to search for profiles of fellow employees within the same group or team as the user but who are in a different building than profiles of fellow employees who have vastly different occupations from the user but who may be in the same building.

As another example, in the case of a school directory, profiles of students who have the same academic major as the user but live relatively distant may be ranked more prominently than profiles of students who have the different academic majors from the user but live relatively close to the user. However, it may be that profiles of students at a different campus having the same major may not be as prominently ranked as profiles of students at the same campus as the user, depending on how the corresponding data fields 136 are weighted in the result ranking configuration 130. Of course, other measures such as, for example, match quality of the profile data 133 to the search query may be combined along with proximity measures by the people search application 115 in determining the order of the profiles returned within a search result set.

Once a set of search results has been generated and ordered by the people search application 115, the people search application 115 may generate one or more network pages 121 that include a listing of descriptions of the search results within the ranked order. The people search application 115 may be configured to generate network pages 121 that include only a proper subset of the search results so that the entire set may be viewed serially within subsequent network pages 121. Links or other user interface components may be provided within a network page 121 for navigation to network pages listing other subsets of the search results. User interface components may also be provided in the network page 121 to alter the ranking of the search results as desired by the user.

The network page server 118 may assemble the network pages 121 based on data provided by the people search application 115 as well as the network page data 127. The network page(s) 121 including the search results may be sent by the network page server 118 over the network 109 to the client 106 for rendering in the browser 142. In various embodiments, data regarding the search results may be asynchronously requested by the client 106 for display within an updated window. To this end, technologies such as dynamic hypertext markup language (DHTML), Java Script, Ajax, and other technologies may be employed.

Figure 2:
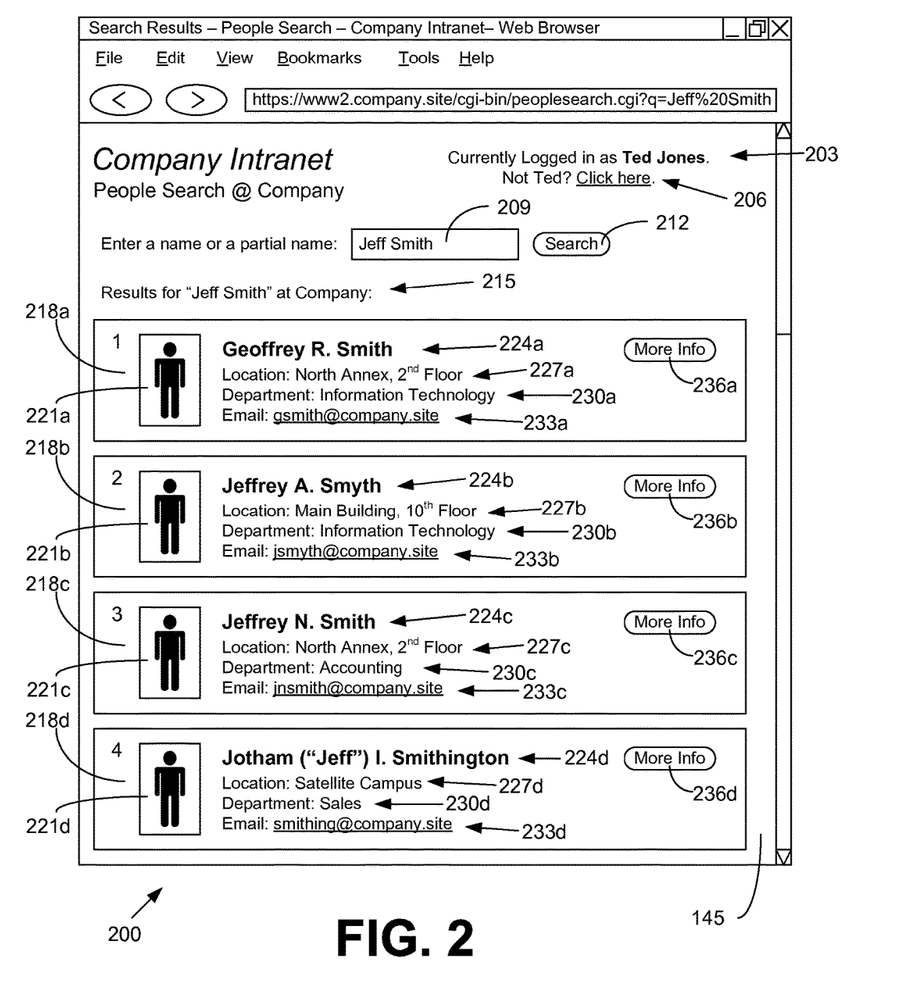
FIG. 2 is a drawing of an example of a user interface rendered by a client in the networked environment of FIG. 1 according to various embodiments of the present disclosure.

Turning now to FIG. 2, shown is one example of a user interface 200 rendered in a browser 142 (FIG. 1) executing in a client 106 (FIG. 1) in the networked environment 100 (FIG. 1). Specifically, FIG. 2 illustrates one example of a rendered network page 145 generated by the people search application 115 (FIG. 1). The rendered network page 145 may include a user logon indication 203 for indicating the identity of the current user as ascertained by the people search application 115. In this example, a text indication is provided that states "Currently Logged in as Ted Jones." Thus, the people search application 115 has identified the user as "Ted Jones." The identification may be performed though a cookie, through an operating system user logon mechanism, through an explicit login using username, password, and/or other security credentials, or through other identification mechanisms.

The user identification may sometimes be inaccurate. For example, in the case of shared clients 106, a different user may be using the browser 142 than the user who originally logged in. To provide for verification of the identity of the user, an identity correction component 206 may be provided. In the example of FIG. 2, the identity correction component 206 states "Not Ted? Click here." Thus, the identity correction component 206 allows the user to correct the identification by selecting a link, button, or other user interface component.

A search query entry component 209 and a search query submission component 212 may be provided for entering a people search query. The search query entry component 209 may be, for example, a text entry component so as to allow a user to enter a text string. As shown in FIG. 2, the user has entered "Jeff Smith" in the search query entry component 209. The search may be executed, for example, by hitting enter or selecting the search query submission component 212. The search query submission component 212 is illustrated as a button, but may comprise a link, image, or other user interface component in other embodiments.

A search status indication 215 may be provided to indicate to the user the current status of the search query, how many results are returned, how relevant the results are, and so on. In FIG. 2, the search status indication 215 shows that the search query "Jeff Smith" has been executed in a directory 124 (FIG. 1) pertaining to "Company" and that search results are provided below. More or less information may be provided in the search status indication 215 in other embodiments. Although the example is of a search query that is a name, it is understood that users may also search for data in data fields 136 (FIG. 1) other than the name(s) of the person.

A plurality of search results 218 are shown within the rendered network page 145. Although four search results 218a, 218b, 218c, and 218d are shown, it is understood that any number of search results 218 may be returned within the rendered network page 145. In some embodiments, the search results 218 may be paginated across multiple rendered network pages 145. As shown in FIG. 2, the search results 218 are ordered so that the most relevant search results 218, as determined by the people search application 115, are located toward the top of the rendered network page 145. It is understood that the ordering may be from left-to-right, bottom-to-top, or in another order in other embodiments.

Each of the search results 218 may include a description of a person associated with a profile from the directory 124. To this end, each search result 218 may include, for example, a profile image 221, a name 224, a location 227, a department 230, an email address 233, and/or other information as desired. A detail selection component 236 may be provided for each search result 218 to permit the user to view more detailed information from the profile of the respective person. In FIG. 2, the detail selection components 236 are illustrated as buttons labeled "More Info," though the detail selection components 236 may comprise links, images, and/or other user interface components in other embodiments.

Regarding the example of FIG. 2, it may be assumed that the user is employed in the "North Annex" in the department of "Information Technology." The first search result 218a is for an employee named "Geoffrey R. Smith." Although the user searched for "Jeff Smith," the search result 218a may have been returned because "Geoff" is a nickname/shortened form for "Geoffrey" and "Jeff" is a phonetic equivalent of "Geoff." Further, the last name "Smith" matches. Thus, such a result may be a partial match of relatively high quality. The location 227 and department 230 may match that of the user, yielding a relatively high proximity score. Accordingly, search result 218a is the most highly ranked search result 218.

The search result 218b is also relatively highly ranked. The queried name "Jeff" may be a nickname for "Jeffrey." Although the last name "Smyth" does not exactly match the queried name "Smith," it may still be a relatively good match depending on the results of a phonetic algorithm such as Soundex, or another phonetic algorithm. Although the person associated with the search result 218b does not work in the same building as the user, the search result 218b may be relatively highly ranked because the person works in the same department 230 as the user. The weight associated with the department 230 data field 136 may make the department data field 136 be a dominant factor compared with the location data field 136 in computing the ranking.

The search result 218c may appear to be a good match, with the name 224c being closer to the name of the search query and the location 227d matching the location of the user. However, the department 230c is "Accounting." Accordingly, under the result ranking configuration 130 (FIG. 1), the search result 218c is not as highly ranked as the search results 218a and 218b because the measure of proximity is not as substantial in the search result 218c.

The search result 218d is associated with a name 224d that is a lower quality match to the search query than the names 224a, 224b, and 224c. The first name "Jotham" does not match at all, and the last name "Smithington" is not an exact or phonetic match to the last name "Smith." However, a recorded nickname "Jeff" matches the search query, and the queried last name is contained within the last name "Smithington." Nonetheless, according to the location 227d and the department 230d, which do not match the location and department of the user, the measure of proximity may be lower than that associated with the search results 218a, 218b, and 218c, yielding the lower ranking for the search result 218d. It is noted that the examples discussed in connection with FIG. 2 are merely for illustration purposes and are not intended to be limiting.

Figure 3:
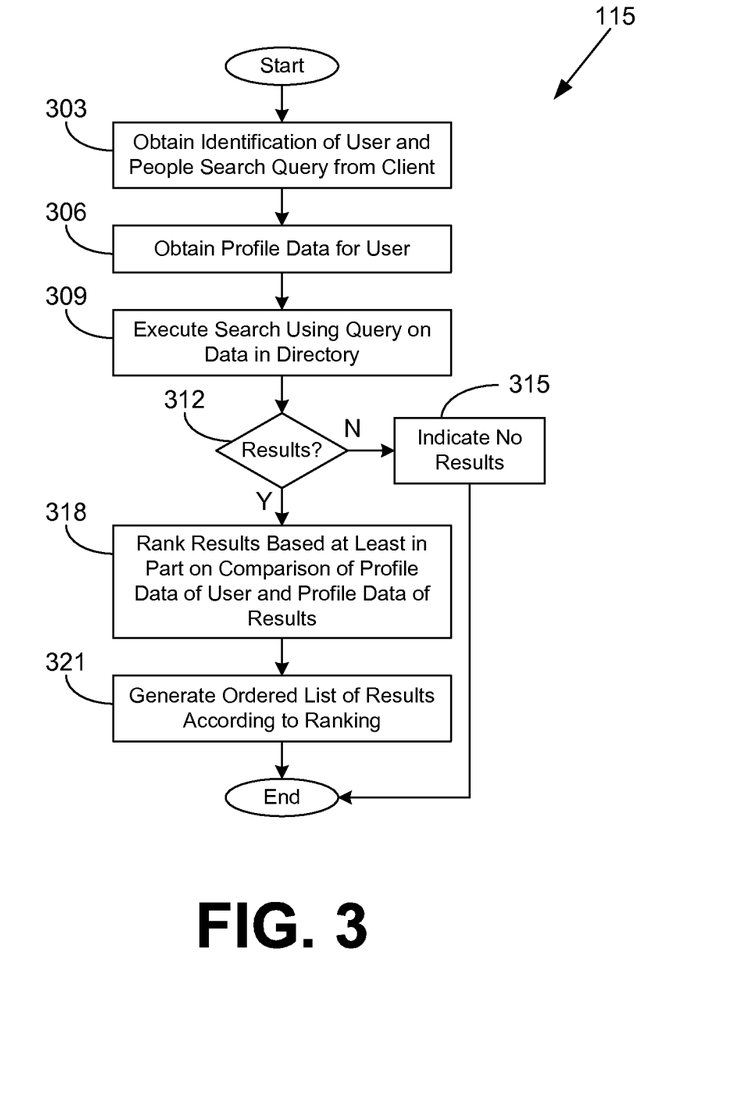
FIG. 3 is a flowchart illustrating one example of functionality implemented as portions of a people search application executed in a computing device in the networked environment of FIG. 1 according to various embodiments of the present disclosure.

Referring next to FIG. 3, shown is a flowchart that provides one example of the operation of a portion of the people search application 115 according to various embodiments. It is understood that the flowchart of FIG. 3 provides merely an example of the many different types of functional arrangements that may be employed to implement the operation of the portion of the people search application 115 as described herein. As an alternative, the flowchart of FIG. 3 may be viewed as depicting an example method implemented in the computing device 103 (FIG. 1) according to one or more embodiments.

Beginning with box 303, the people search application 115 obtains an identification of a user and a people search query from a client 106 (FIG. 1). The user may be identified, for example, through an authentication based on one or more security credentials. In various embodiments, the search query may include a plurality of search terms. In box 306, the people search application 115 obtains profile data 133 (FIG. 1) associated with the user from the directory 124 (FIG. 1) of person profiles. In box 309, the people search application 115 executes a search using the search query on data fields 136 (FIG. 1) such as names and/or other data provided in the directory 124. In some embodiments, the people search application 115 may execute the search using the search query on other data in addition to the directory, such as, for example, a collection of documents, multimedia, etc.

The people search application 115 determines in box 312 whether any results are obtained from the search. Results may correspond to profiles, documents, and/or other data that at least approximately match the search query. If no results are obtained, the people search application 115 moves to box 315 and indicates that no results were obtained. Thereafter, the portion of the people search application 115 ends.

If, instead, search results are obtained in box 312, the people search application 115 proceeds to box 318 and ranks the profiles in the results based at least in part on the comparison of the profile data 133 of the user and the profile data 133 in the search results. Such a comparison may be said to comprise a measure of proximity or similarity, and a respective proximity score or similarity score may be computed for each result. The results may also be ordered based in part on a corresponding measure of match quality between the search query and each of the results. The ordering may be performed with a weighted sum of intermediate scores based on various components of the proximity scores. In box 321, the people search application 115 generates an ordered list of results according to the ranking. The list, or a portion of the list, may be included within a network page 121 (FIG. 1) for sending back to the client 106. Thereafter, the portion of the people search application 115 ends.

Figure 4:
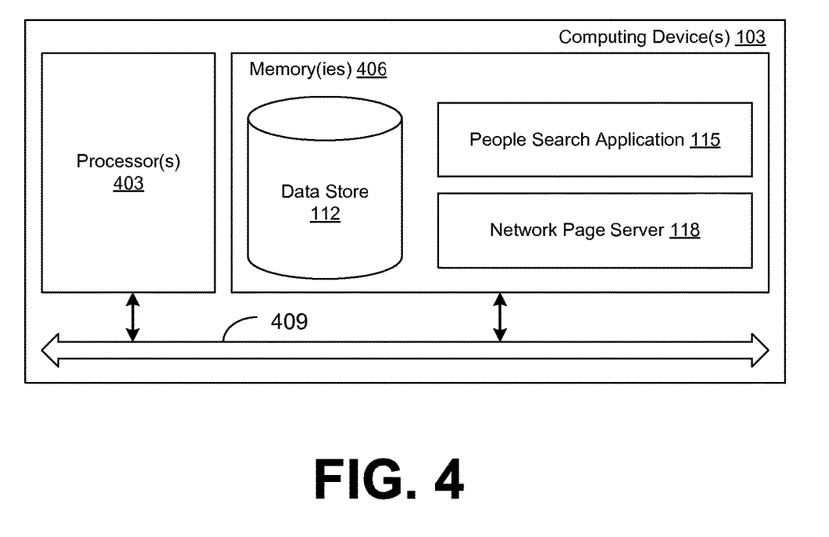
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the people search application 115, the network page server 118, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the people search application 115, the network page server 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the people search application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the people search application 115 and the network page server 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program causes the computing device to at least:
   obtain a search string from a client;
   obtain a user profile associated with the client from a directory of person profiles;

execute a name search in the directory using the search string, thereby obtaining a plurality of person profiles from the directory that at least approximately match the search string based at least in part on respective names associated with individual ones of the plurality of person profiles;

generate a corresponding proximity score for the individual ones of the plurality of person profiles based at least in part on comparing location information for the user profile with respective location information and department data for the individual ones of the plurality of person profiles, a weight of the department data being greater than a weight of the location information for the corresponding proximity score; and generate a plurality of search results for the name search, individual ones of the plurality of search results corresponding to individual ones of the plurality of person profiles, the plurality of search results being ordered based at least in part on a name match quality of the respective names to the search string and the corresponding proximity score for the individual ones of the plurality of person profiles to the user profile.

2. The non-transitory computer-readable medium of claim 1, wherein the name match quality is based at least in part on a phonetic algorithm.

3. The non-transitory computer-readable medium of claim 1, wherein the user profile is identified by at least one security credential for authentication.

4. A system, comprising:
   at least one computing device; and
   a people search application executable in the at least one computing device, wherein when executed the people search application causes the at least one computing device to at least:
      obtain a search string from a client device;
      identify a user profile of a user;
      execute a name search for the search string on a directory, thereby obtaining a plurality of resulting profiles, individual ones of the plurality of resulting profiles comprising a name that matches the search string;
      determine a name match quality for individual ones of the plurality of resulting profiles based at least in part on the search string;
      determine a profile proximity for individual ones of the plurality of resulting profiles to the user profile based at least in part on a comparison of department data and location data for the user profile with department data and location data for the individual ones of the plurality of resulting profiles, a weight of department data being considered greater than a weight of the location data for the profile proximity; and
      generate a plurality of search results for the name search, individual ones of the plurality of search results being ordered using the name match quality based at least in part on the search string and the profile proximity for the individual ones of the plurality of resulting profiles to the user profile.

5. The system of claim 4, wherein when executed the people search application further causes the at least one computing device to at least obtain the user profile according to an at least one security credential.

6. The system of claim 5, wherein the plurality of resulting profiles are further ranked based at least in part on a corresponding similarity score associated with each one of the plurality of resulting profiles, the corresponding similarity score being derived from a comparison of the user profile and a respective one of the plurality of resulting profiles.

7. The system of claim 6, wherein the comparison involves comparing a plurality of data fields of the user profile with a corresponding plurality of data fields in a respective one of the resulting profiles to produce a plurality of intermediate scores, applying a respective weight to each of the intermediate scores to produce a plurality of weighted intermediate scores, and summing the weighted intermediate scores to produce the corresponding similarity score.

8. The system of claim 4, wherein executing the search includes executing the search on other data, thereby obtaining a plurality of other results that match the search string.

9. The system of claim 4, wherein the directory corresponds to a staff directory of an organization.

10. The system of claim 4, wherein when executed the people search application further causes the at least one computing device to at least determine the profile proximity by comparing a current physical location of the user to respective location information.

11. The system of claim 10, wherein the current physical location is a corresponding designated work location.

12. The system of claim 10, wherein the current physical location of the user is determined by a Global Positioning System (GPS) device associated with the user.

13. A method, comprising:
   obtaining, in at least one computing device, a search string and an identification of a user;
   determining, in the at least one computing device, a plurality of profiles in a person profile directory that match the search string;
   determining, in the at least one computing device, a name match quality score and a proximity score for each of the plurality of profiles, each name match quality score indicating a measure of quality of a match between the search string and a respective name field included in a respective profile, each proximity score indicating a measure of proximity between a user profile associated with the user and the respective profile based at least in part on a location, a department, and a team identified for each of the user and the respective profile, a weight of the department being greater than a weight of the location for the proximity score; and
   generating, in the at least one computing device, a listing of the plurality of profiles that is ordered based at least in part on corresponding name match quality scores of the respective name field to the search string and corresponding proximity scores of the respective profile to the user profile.

14. The method of claim 13, wherein the proximity score is determined based at least in part on a distance between a current location associated with the user and a geographic location associated with the respective profile based at least in part on a building and a floor of the building identified for the respective profile.

15. The method of claim 13, wherein the proximity score is determined based at least in part on a comparison between a data field of the user profile associated with the user and a corresponding data field of the respective profile.

16. The method of claim 13, wherein the proximity score is determined based at least in part on a comparison between an organizational department of the user profile and an organizational department listed in the respective profile.

17. The method of claim 13, wherein the match between the search string and the respective name field is identified when the respective name field of the respective profile includes at least one term of the search string.

18. The method of claim 13, wherein the match between the search string and the respective name field is identified when a similarity scoring component applied to at least one term of the search string and the respective name field of the respective profile produces a similarity score that meets a threshold.

19. The method of claim 18, wherein the similarity scoring component employs a phonetic algorithm to produce the similarity score.

20. The method of claim 13, wherein the proximity score is determined based at least in part on a comparison between an academic major of the user and an academic major listed in the respective profile.

21. The method of claim 13, wherein the proximity score is determined based at least in part on a comparison between access privileges of the user and access privileges indicated in the respective profile.

* * * * *